(12) United States Patent
Kasuya et al.

(10) Patent No.: US 12,130,630 B2
(45) Date of Patent: Oct. 29, 2024

(54) MOTION DETECTING DEVICE

(71) Applicant: MELTIN Inc., Tokyo (JP)

(72) Inventors: Masahiro Kasuya, Tokyo (JP); Tatsuya Seki, Tokyo (JP)

(73) Assignee: MELTIN Inc., Tokyo (JP)

( * ) Notice: Subject to any disclaimer, the term of this patent is extended or adjusted under 35 U.S.C. 154(b) by 610 days.

(21) Appl. No.: 17/099,577

(22) Filed: Nov. 16, 2020

(65) Prior Publication Data

US 2021/0072762 A1    Mar. 11, 2021

Related U.S. Application Data

(63) Continuation of application No. PCT/JP2018/020103, filed on May 25, 2018.

(51) Int. Cl.
| | | |
|---|---|---|
| *G06F 3/01* | (2006.01) | |
| *B25J 13/02* | (2006.01) | |
| *B25J 13/08* | (2006.01) | |
| *B25J 15/00* | (2006.01) | |
| *G01P 13/00* | (2006.01) | |
| *G05D 1/00* | (2006.01) | |

(52) U.S. Cl.
CPC .......... *G05D 1/0227* (2013.01); *B25J 13/085* (2013.01); *G01P 13/00* (2013.01)

(58) Field of Classification Search
CPC ..... G05D 1/0227; B25J 13/085; B25J 13/025; B25J 13/02; B25J 15/0009; B25J 1/00; B25J 1/02; B25J 3/04; B25J 9/1692; B25J 13/08; B25J 13/081; B25J 15/08; B25J 15/10; B25J 15/12; G01P 13/00; G06F 3/014; G06F 3/016; G06F 3/0234
See application file for complete search history.

(56) References Cited

U.S. PATENT DOCUMENTS 5,555,894 A * 9/1996 Doyama ................ A61B 5/225
                                                 600/595
5,778,885 A * 7/1998 Doyama ................ G06F 3/016
                                                 600/595
(Continued)

FOREIGN PATENT DOCUMENTS

DE    19957155 C1    6/2001
JP    H4210390 A     7/1992
(Continued)

OTHER PUBLICATIONS

International Search Report in PCT Application No. PCT/JP2018/020103, mailed Aug. 7, 2018, 5pp.
(Continued)

*Primary Examiner* — Adam R Mott
*Assistant Examiner* — Byron Xavier Kasper
(74) *Attorney, Agent, or Firm* — Renner, Otto, Boisselle & Sklar, LLP

(57) ABSTRACT

The motion detecting device that detects motion of an operator's finger for remotely operating a multi-articulated robot includes a device main body that is installed such that the finger is placed thereon, a contact part that follows a shape of the finger in the device main body and is in contact with the finger, and a detection part that detects the motion of the finger on the basis of a pressing state of the finger against the contact part.

16 Claims, 11 Drawing Sheets

(56) References Cited

U.S. PATENT DOCUMENTS

| | | | | |
|---|---|---|---|---|
| 2006/0195622 | A1* | 8/2006 | Kumazawa | G06F 3/0234 |
| | | | | 710/5 |
| 2008/0246735 | A1* | 10/2008 | Reynolds | G06F 3/016 |
| | | | | 345/173 |
| 2012/0316681 | A1* | 12/2012 | Hagn | G06F 3/014 |
| | | | | 700/258 |
| 2014/0165770 | A1* | 6/2014 | Abri | B25J 13/025 |
| | | | | 606/130 |
| 2017/0312043 | A1* | 11/2017 | Ogawa | A61B 18/1445 |
| 2019/0258316 | A1* | 8/2019 | Suzuki | A61B 34/74 |
| 2020/0356235 | A1* | 11/2020 | Arimatsu | G06F 3/01 |

FOREIGN PATENT DOCUMENTS

| | | | | |
|---|---|---|---|---|
| JP | H7146751 | A | | 6/1995 |
| JP | 2002196882 | A | * | 7/2002 |
| JP | 2004110259 | A | * | 4/2004 |
| JP | 200514166 | A | | 1/2005 |
| JP | 2005267174 | A | | 9/2005 |
| WO | 2005057395 | A1 | | 6/2005 |
| WO | WO-2011070554 | A2 | * | 6/2011 ............. G06F 3/014 |

OTHER PUBLICATIONS

Written Opinion in PCT Application No. PCT/JP2018/020103, mailed Aug. 7, 2018, 4pp.
Written Opinion in PCT Application No. PCT/JP2018/020103, mailed Aug. 7, 2018, 12pp.
Office Action in JP Application No. 2020-520975, mailed Feb. 16, 2021, 9pp.

* cited by examiner

MOTION DETECTING DEVICE

CROSS-REFERENCE TO RELATED APPLICATIONS

The present application is a continuation application of International Application number PCT/JP2018/020103, filed on May 25, 2018. The contents of this application are incorporated herein by reference in their entirety.

BACKGROUND OF THE INVENTION

The present invention relates to a motion detecting device that detects a motion of an operator's finger for remotely operating a multi-articulated robot.

Conventionally, a remote control system in which a robot hand, which is an example of a multi-articulated robot, is remotely controlled by an operator has been utilized. For example, Japanese Unexamined Patent Application Publication No. H4-210390 discloses a technique for operating a robot hand by following a detected operation of a finger of an operator who puts on a glove, in which a sensor and an optical fiber for detecting an operation of a finger is provided.

In the above-mentioned glove, for example, a bending-type sensor is used to detect the motion of the finger, but such a sensor is fragile and has low detection accuracy. Further, since the operator needs to put on the glove in a manner that does not damage the sensor and the like installed inside, there is a problem that it is difficult to put on the glove.

BRIEF SUMMARY OF THE INVENTION

This invention focuses on these points and an object of the present invention is to provide a motion detecting device which is capable of detecting a motion of an operator's hand for operating the multi-articulated robot with higher accuracy, and which has excellent durability and ease of wearing.

In a first aspect of the present invention, a motion detecting device for detecting a motion of an operator's finger for remotely operating a multi-articulated robot is provided, the motion detecting device includes a device main body that is installed such that the finger is placed thereon, a contact part that is where the finger contacts the device main body and has a shape following shape of the finger, and a detection part that detects the motion of the finger on the basis of a pressing state of the finger against the contact part.

DETAILED DESCRIPTION OF THE INVENTION

Configuration of a Remote Control System for a Robot

The configuration of a remote control system for a robot according to an embodiment of the present invention will be described by referring to FIG. 1.

Figure 1:
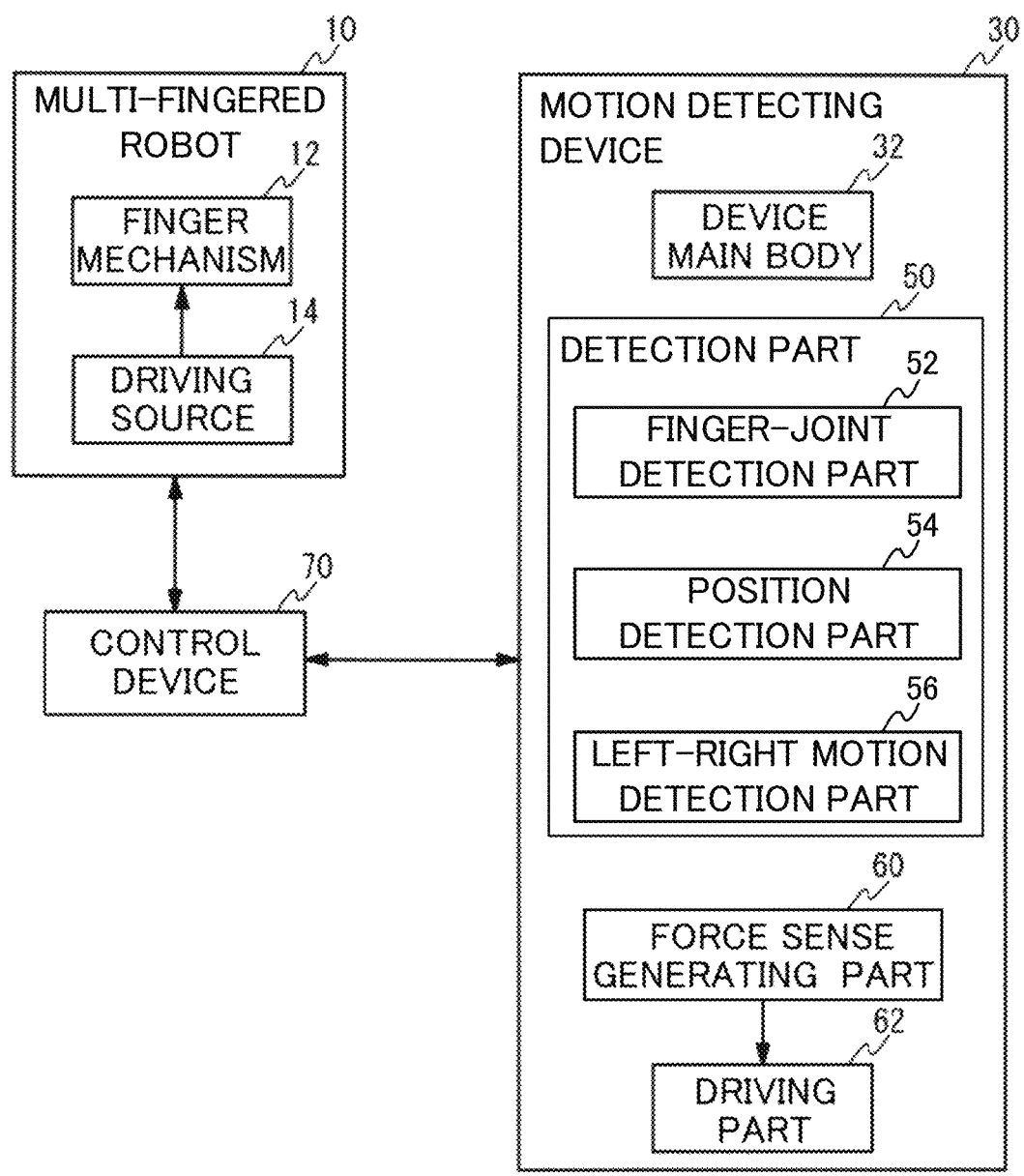
FIG. 1 is a block diagram illustrating a configuration of a remote control system S for a robot according to an embodiment of the present invention.

FIG. 1 is a block diagram illustrating a configuration of a remote control system S for a robot according to an embodiment of the present invention. The remote control system S includes a multi-fingered robot 10, a motion detecting device 30, and a control device 70, as shown in FIG. 1. The remote control system S detects a motion of a hand (specifically, a finger) of an operator, who performs a remote operation, with the motion detecting device 30, and operates the multi-fingered robot 10 in conjunction with the detected motion of the hand.

Figure 2:
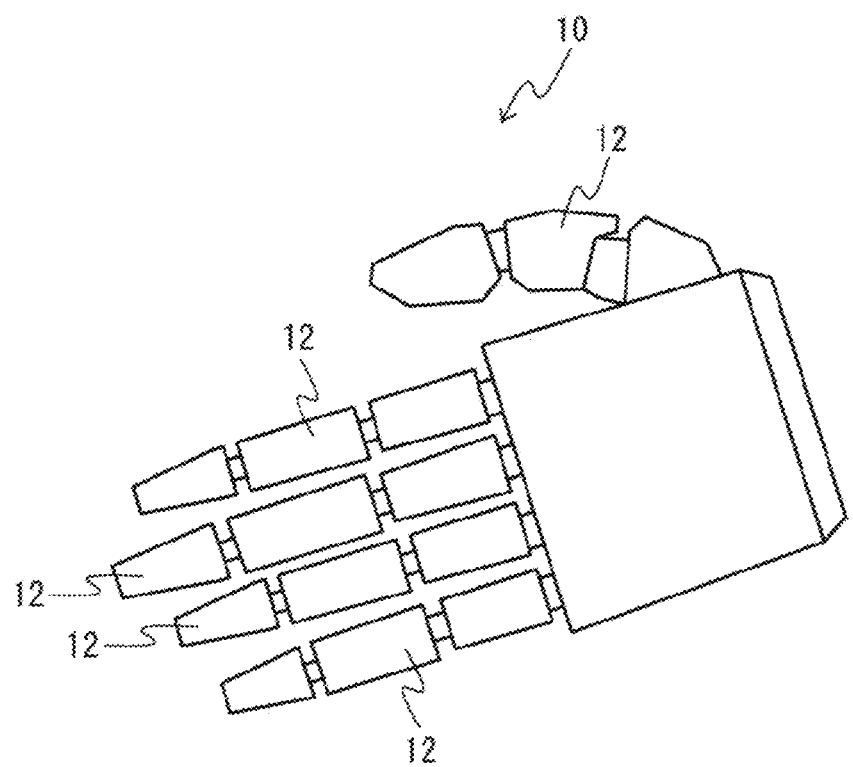
FIG. 2 is a schematic diagram illustrating a configuration example of a multi-fingered robot 10.

FIG. 2 is a schematic diagram illustrating a configuration example of the multi-fingered robot 10. The multi-fingered robot 10 is a multi-articulated robot that is remotely controlled by the operator. The multi-fingered robot 10 here is a humanoid robot hand which has a shape following a shape of a human hand, as shown in FIG. 2. The multi-fingered robot 10 touches or grasps an object. FIG. 2 only shows the robot hand which follows after a human right hand as the multi-fingered robot 10, but a robot hand which follows after a human left hand has a similar configuration. The multi-fingered robot 10 has a finger mechanism 12 and a driving source 14 as shown in FIG. 1.

As shown in FIG. 2, five finger mechanisms 12 are provided corresponding to five fingers (thumb, index finger, middle finger, ling finger, and little finger) of a human hand. Each of the five finger mechanisms 12 is an articulation mechanism driven by the driving source 14.

The driving source 14 is an actuator such as a motor. The driving source 14 operates the finger mechanism 12 by, for example, a mechanical tendon wire drive. Upon receiving an operation command from the control device 70, the multi-fingered robot 10 operates the corresponding finger mechanisms 12 in conjunction with the motion of the five fingers of the remote operator's hand.

The motion detecting device 30 is a detecting device for detecting a motion of an operator's hand, specifically a finger, for remotely operating the multi-fingered robot 10. The motion detecting device 30 here includes a left hand detecting device for detecting the motion of the fingers of the operator's left hand and a right hand detecting device for detecting the motion of the fingers of the operator's right hand. The left hand detecting device and the right hand detecting device have the same configuration.

As shown in FIG. 1, the motion detecting device 30 includes a device main body 32, a detection part 50, and a force sense generating part 60. The device main body 32 here is installed such that the operator can easily place his/her hand thereon. For example, the device main body 32 is installed at a position where the operator with a sitting posture or a standing posture can easily place his/her hand. The operator moves his/her finger with his/her hand placed on the device main body 32. For example, the operator bends or extends his/her finger placed on the device main body 32. Further, the operator spreads or shrinks the space between two fingers.

The device main body 32 includes a main body for left hand on which the operator's left hand is placed and a main body for right hand on which the right hand is placed. The operator moves his/her left-hand finger with his/her left hand placed on the main body for left hand, and moves his/her right-hand finger with his/her right hand placed on the main body for right hand. Since the main body for left hand and the main body for right hand have the same configuration, the device main body 32 will be described below by taking the main body for right hand as an example.

Figure 3:
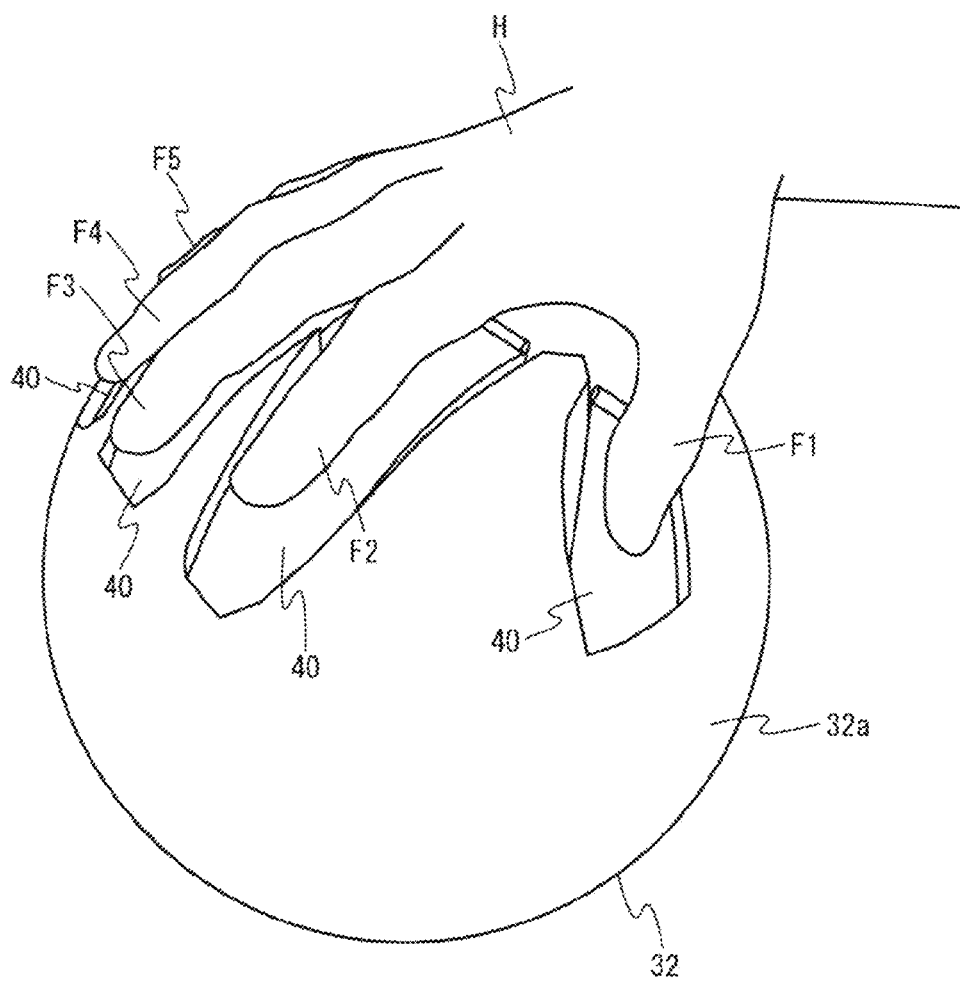
FIG. 3 is a schematic diagram showing an example of a state in which the right hand of an operator is placed on a device main body 32.
Figure 4:
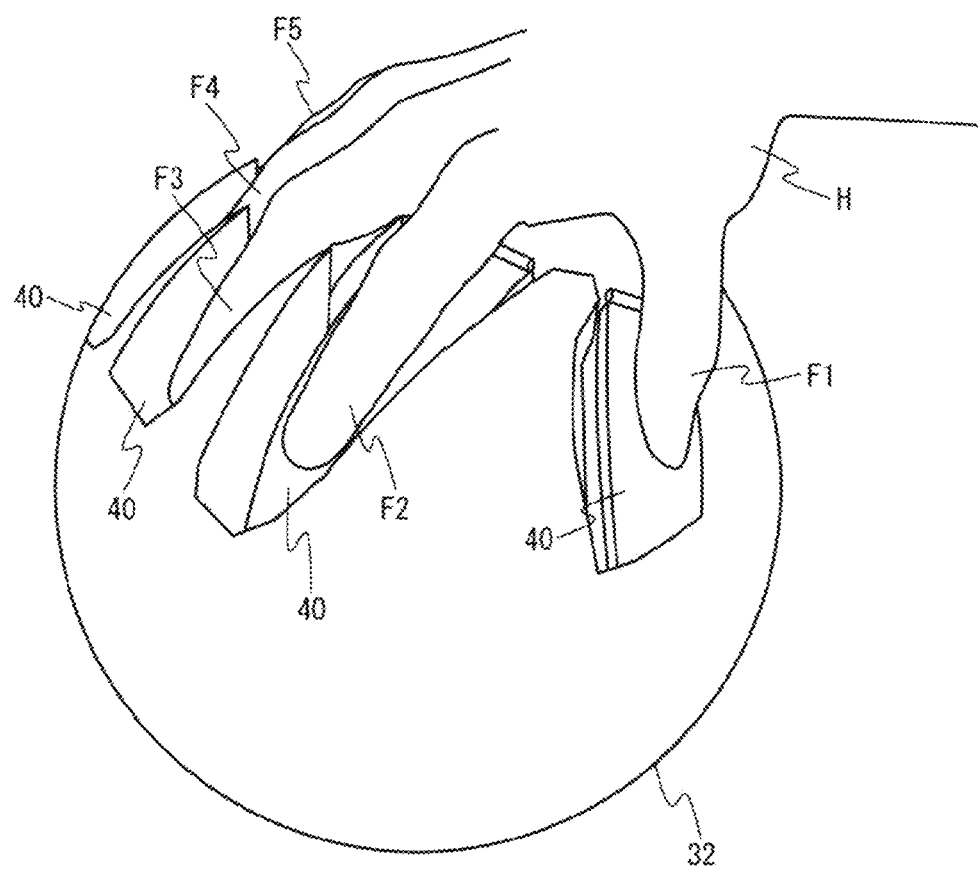
FIG. 4 is a schematic diagram showing an example in which the operator bends the right-hand fingers.

FIG. 3 is a schematic diagram showing an example of a state in which the right hand H of the operator is placed on the device main body 32. FIG. 4 is a schematic diagram showing an example in which the operator bends the fingers of the right hand H. As shown in FIGS. 3 and 4, the operator places a palm side of his/her hand on the device main body 32. As shown in FIG. 3, the device main body 32 is provided with contact parts 40 which the five fingers (a thumb F 1, an index finger F2, a middle finger F3, a ring finger F4, and a little finger F5) of the light hand H of the operator contact respectively. The contact part 40 here is positioned at substantially the same position as an outer peripheral surface 32a of the device main body 32, and is exposed to the outside. The detailed configuration of the contact part 40 will be described later.

The detection part 50 detects the motion of the operator's finger. The detection part 50 detects the motion of the finger on the basis of the pressing state of the operator's finger against the contact part 40. For example, the detection part 50 detects a posture of the finger (for example, a posture of the bent finger) on the basis of the pressing state of the finger against the contact part 40 when the operator presses the contact part 40 by bending his/her finger. The pressing state of the finger is a concept that includes both the position where the finger presses the contact part 40 and pressing force. The force of pressing by the finger can be detected on the basis of, for example, the pressing amount of the contact part 40 by the finger, but the force of the pressing may be detected by another method (for example, a change in capacitance at the pressing position of the finger).

Further, the detection part 50 can estimate the motion of the entire hand by detecting the motion (including the posture) of each of the five fingers. For example, the detection part 50 detects that the operator bends the five fingers as shown in FIG. 4 from the state shown in FIG. 3. The detection part 50 includes a phalange detection part 52, a position detection part 54, and a left-fight motion detection part 56, which will be described later in detail, to detect the motion of the finger with higher accuracy.

The force sense generating part 60 generates a force sense corresponding to a reaction force from an object when the multi-fingered robot 10 touches the object. In addition, the force sense generating part 60 may drive the contact part 40 such that the finger posture of the operator corresponds with that of the multi-fingered robot 10 if the multi-fingered robot 10 is moved by an external cause. The force sense generating part 60 operates the contact part 40 (specifically, the rotating members 45a to 45e shown in FIG. 5) via the driving part 62, which will be described later in detail, to transmit the force sense to the operator's finger being in contact with the contact part 40. The force sense is a sense related to touch among five senses (the senses of sight, hearing, touch, taste, and smell) possessed by a human, and mainly means a haptic sense sensed by a human when he/she is in contact with an object.

For example, the force sense generating part 60 generates the force sense when the multi-fingered robot 10 which is bending the finger mechanism 12 to grasp an object cannot further bend the finger mechanism 12. Thus, by receiving the generated force sense with the finger, the operator can recognize that the remotely operated multi-fingered robot 10 cannot further bend the finger mechanism 12 or the softness of the object being grasped.

The control device 70 controls the motion of the multi-fingered robot 10 according to the operator's hand motion detected by the motion detecting device 30. In other words, the control device 70 operates each of the corresponding finger mechanisms 12 in conjunction with the motion of each of the operator's fingers. It should be noted that the control device 70 may be integrated with the motion detecting device 30 to be a single device.

The control device 70 operates the finger mechanism 12 to correspond with, for example, the detected finger posture. For example, the control device 70 causes the multi-fingered robot 10 (specifically, the robot hand which follows after the right hand) to bend the finger mechanism 12 when the motion detecting device 30 detects that the operator bends the right-hand finger as shown in FIG. 4. Further, the control device 70 may operate the finger mechanism 12 by adjusting the angular velocity of the phalange of the finger mechanism 12 in accordance with the magnitude of the pressing force of the operator's finger pressing. In addition, the control device 70 may operate the multi-fingered robot 10 at a predetermined magnification of the finger motion (for example, a bending amount).

Detailed Configuration of the Device Main Body 32

The detailed configuration of the device main body 32 of the motion detecting 8 device 30 will be described referring to FIGS. 5 and 6.

Figure 5:
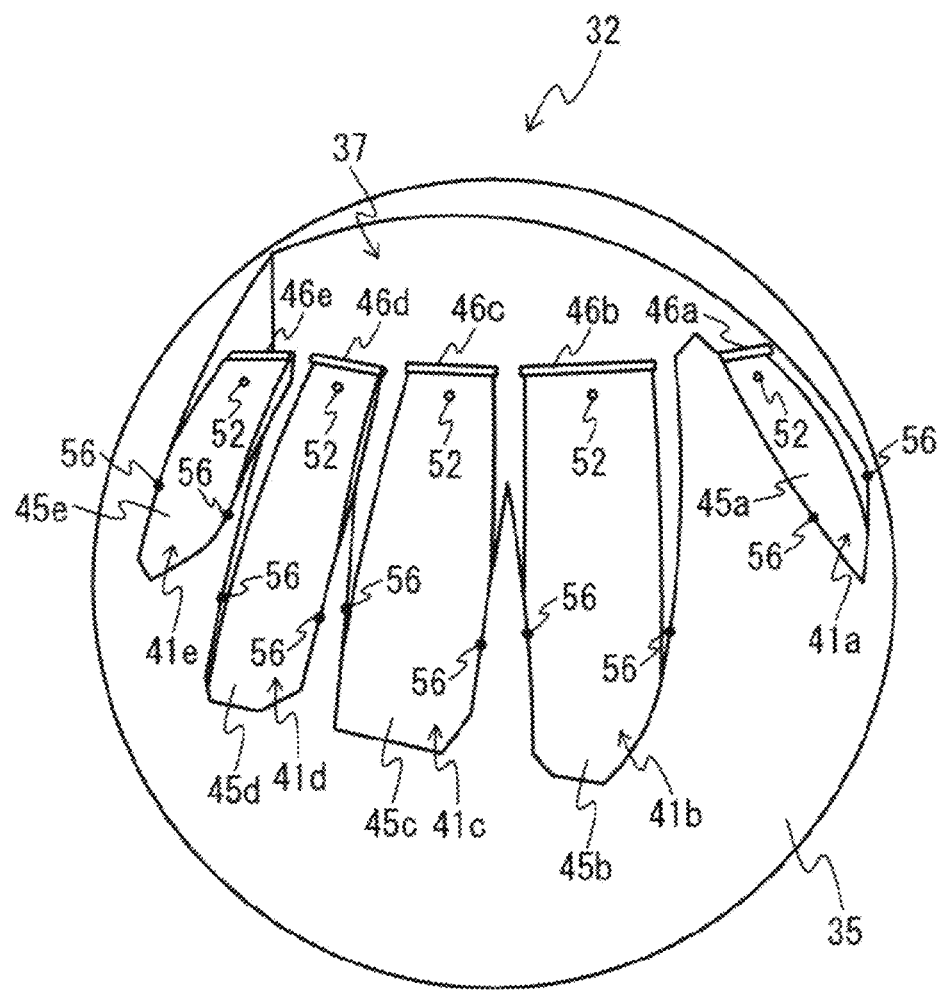
FIG. 5 is a schematic diagram illustrating a configuration example of the device main body 32.

FIG. 5 is a schematic diagram illustrating a configuration example of the device main body 32. FIG. 6 is a schematic diagram of the device main body 32 shown in FIG. 5, seen from the rear. In FIG. 5, the positions of the phalange detection parts 52 and the left-right motion detection parts 56 are indicated by circles for convenience of explanation. The device main body 32 has a spherical part 35, as shown in FIG. 5. The spherical part 35 is a part on which the operator moves his/her finger with his/her hand placed thereon. The spherical part 35 here is spherical. However, the present invention is not limited thereto, and the spherical part 35 may have a shape including a part of an ellipsoid, or may be an ellipsoid. The spherical part 35 formed in this manner facilitates the operator in moving his/her hand placed thereon. Although not shown in FIGS. 5 and 6, a support part for supporting the spherical part 35 for installation may be connected to the spherical part 35.

The spherical part 35 includes a groove part 37 formed on the outer peripheral surface as shown in FIG. 5. The groove part 37 is shaped to follow the shape of the operator's hand, and the operator places the palm side of his/her hand on the groove part 37 (see FIG. 3). The groove part 37 is provided with the finger contact parts 41a to 41e which the operator's five fingers respectively contact, as the aforementioned contact parts 40. The finger contact parts 41*a* to 41*e* are provided along the outer peripheral surface of the spherical part 35.

The finger contact parts 41*a* to 41*e* are portions that the operator's fingers contact (specifically, finger pads). Here, the thumb of the operator contacts the finger contact part 41*a*, the index finger contacts the finger contact part 41*b*, the middle finger contacts the finger contact part 41*c*, the ring finger contacts the finger contact part 41*d*, and the little finger contacts the finger contact part 41*e*. Further, the finger contact parts 41*a* to 41*e* are shaped to follow the shapes of the operator's five fingers. Specifically, the sizes of the finger contact parts 41*a* to 41*e* are proportional to the sizes of the corresponding fingers. This makes it easy for the operator to bring the five fingers into contact with the corresponding finger contact parts 41*a* to 41*e*, respectively.

Figure 6:
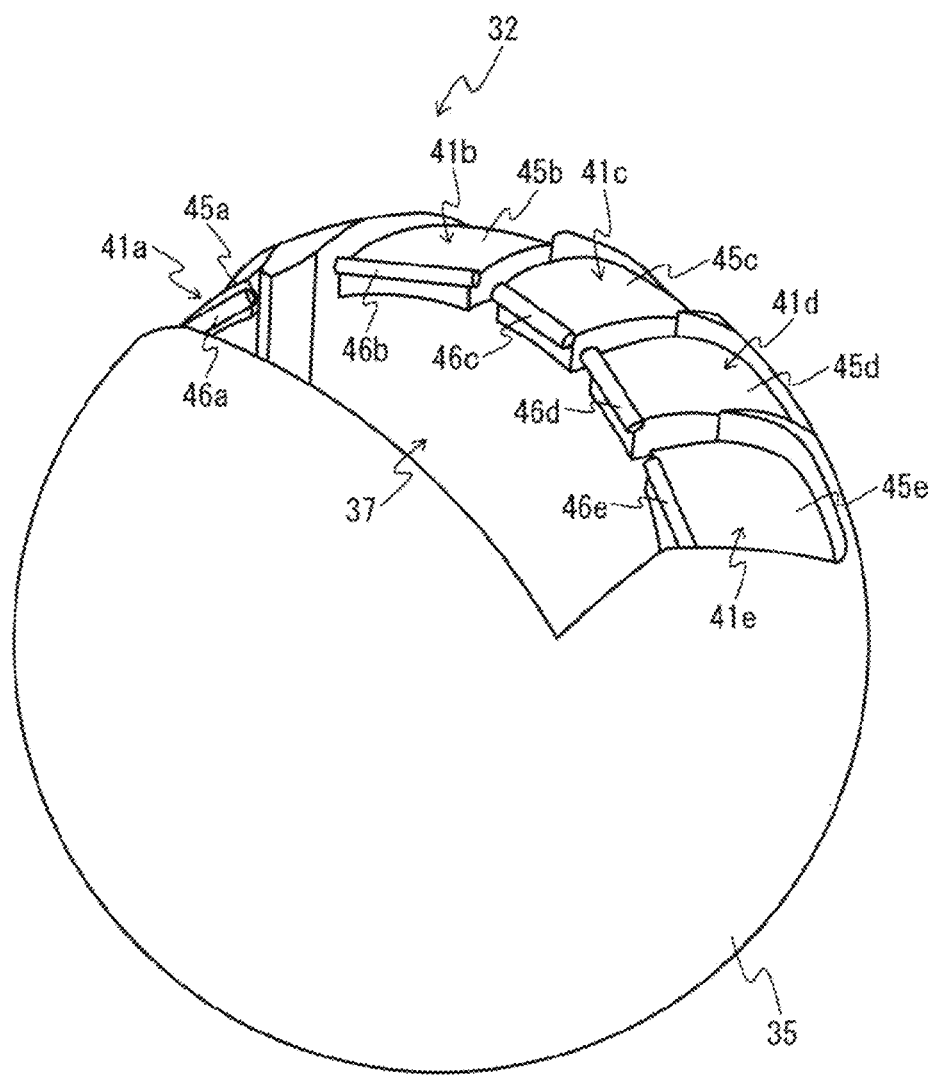
FIG. 6 is a schematic diagram of the device main body 32 shown in FIG. 5, seen from the rear.

The regions of the finger contact parts 41*a* to 41*e* where the finger pads contact are curved convexly toward the fingers (see FIG. 6). In other words, each of the finger contact parts 41*a* to 41*e* is convexly curved so as to follow the shape of the corresponding finger. Here, the regions of the finger contact parts 41*a* to 41*e* contacted by the finger pads are curved at a predetermined curvature. It should be noted that the finger contact parts 41*a* to 41*e* may be curved convexly by connecting a plurality of surfaces. This makes it easy for the operator to move the five fingers while keeping the fingers placed on the finger contact parts 41*a* to 41*e* without discomfort.

The finger contact parts 41*a* to 41*e* have the rotating members 45*a* to 45*e*, as shown in FIG. 5, that are rotatable in accordance with the finger motion. The rotating members 45*a* to 45*e* are rotatably provided around the shaft parts 46*a* to 46*e*. The rotating members 45*a* to 45*e* rotate around shaft parts 46*a* to 46*e* by being pressed by the operator's fingers. For example, when the operator bends the fingers and presses the rotating members 45*a* to 45*e* (see FIG. 4), the rotating members 45*a* to 45*e* rotate toward the inside of the device main body 32 around the shaft parts 46*a* to 46*e*. On the other hand, when the operator extends the bent fingers, the rotating members 45*a* to 45*e* return to the state before the rotation (see FIG. 3). Surfaces of the rotating members 45*a* to 45*e* are, for example, curved surfaces having a predetermined curvature.

In the above description, the contact part 40 includes the rotating members 45 that rotate in accordance with the finger motion, but the present invention is not limited thereto. For example, the contact part 40 may include an elastic member (for example, a rubber member) that elastically deforms in accordance with a pressing state of the finger. In this case, a mechanism for rotating the rotating members 45 is unnecessary.

Each of the finger contact parts 41*a* to 41*e* is provided with the detection part 50 described above. The detection part 50 detects the motion of each finger on the basis of the pressing state of each of the fingers placed on the finger contact parts 41*a* to 41*e*. That is, when the operator presses the rotating members 45*a* to 45*e* of the finger contact parts 41*a* to 41*e*, the detection part 50 detects the motion of the fingers on the basis of the pressing state of the fingers against the rotating members 45*a* to 45*e*. For example, the detection part 50 detects the finger motion when the operator bends or extends the fingers placed on the rotating members 45*a* to 45*e*.

The detection part 50 detects the rotation amounts of the rotating members 45*a* to 45*e*. Further, the detection part 50 also includes the phalange detection part 52, the position detection part 54, and the left-right motion detection part 56, as shown in FIG. 1. A plurality of detection parts provided in this way allows detection of the motion of the finger with higher accuracy even if the operator moves his/her finger in various ways to remotely operate the multi-fingered robot 10.

The phalange detection part 52 is arranged at a position corresponding to a phalange (at least one of the proximal, middle, and distal phalanges) of the finger and detects the state of the phalange. The phalange detection part 52 is, for example, a contact-type sensor that performs detection when the phalange touches the sensor, or a non-contact-type sensor that performs detection from a distant position.

The phalange detection part 52 is arranged on each of the rotating members 45*a* to 45*e*. Here, the phalange detection part 52 is arranged at a position corresponding to the proximal phalange of each finger (see FIG. 5). For example, the phalange detection part 52 provided on the rotating member 45*b* is arranged at a position corresponding to the proximal phalange of the operator's index finger.

The position detection part 54 detects the position of the fingertip of the finger. For example, when the operator bends the finger, the position detection part 54 detects the position of the fingertip of the bent finger. The position detection part 54 is also provided on the rotating members 45*a* to 45*e*. The position detection part 54 includes, for example, a touch sensor (for example, capacitive type) provided on the surfaces of the rotating members 45*a* to 45*e*, and detects the position of the fingertip which is in contact with the touch sensor.

Figure 7:
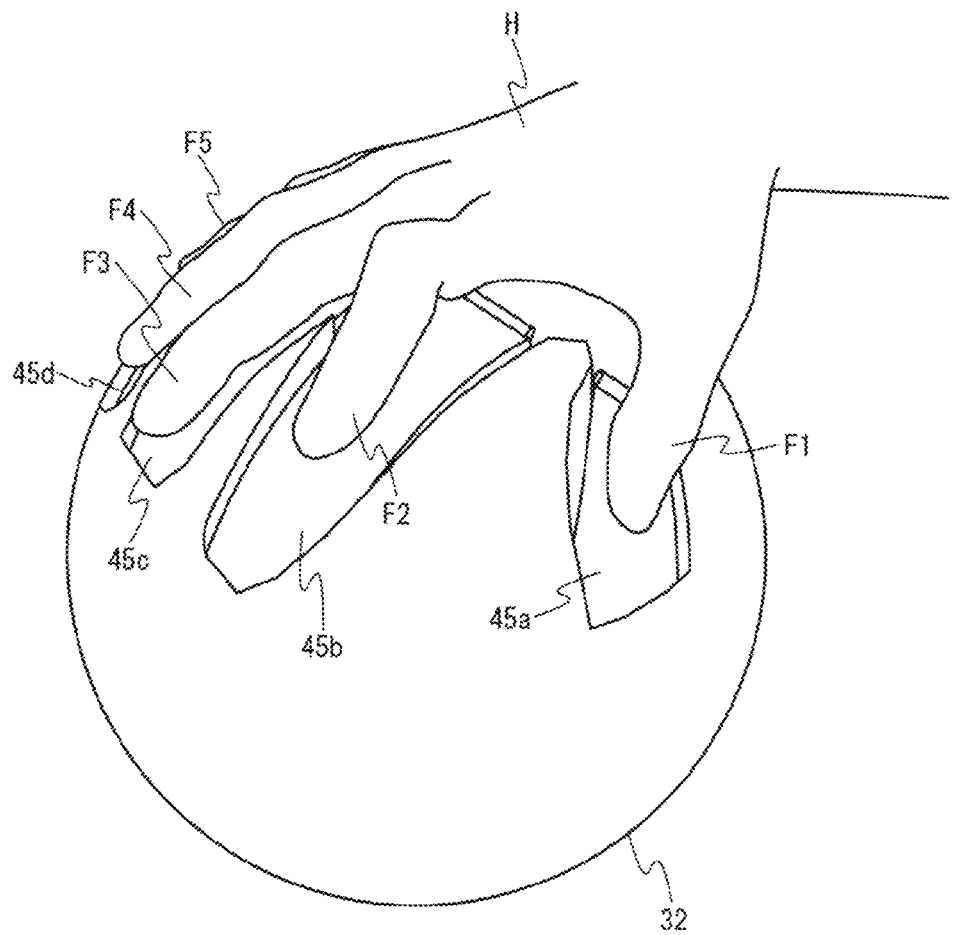
FIG. 7 is a schematic diagram illustrating detection of a position of a fingertip.

FIG. 7 is a schematic diagram illustrating detection of the position of the fingertip. In FIG. 7, the operator bends the index finger, and the fingertip of the index finger is in contact with the rotating member 45*b*. At this time, the position detection part 54 detects the position of the fingertip of the index finger in the bent state or the sliding distance (moving distance) of the index finger on the rotating member 45*b*.

The detection part 50 detects the motion of the finger on the basis of the position of the fingertip detected by the position detection part 54 and the rotation amounts of the rotating members 45*a* to 45*e*. For example, when the index finger is bent as shown in FIG. 7, the detection part 50 can estimate the bending state (posture) of the index finger by detecting the rotation amount of the rotating member 45*b* and the position of the fingertip of the index finger by using the position detection part 54. Detecting the motion in this manner makes it possible to detect the motion of the index finger appropriately without providing the phalange detection part 52 for each of the three phalanges of the index finger. The left-right motion detection part 56 detects the motion of the finger at least in one of the right and left directions. The left-right motion detection part 56 is arranged, for example, in a region of the groove part 37 where side surfaces of the finger make contact. Specifically, the left-right motion detection parts 56 are respectively arranged on each of both side walls of the rotating members 45*a* to 45*e* in the groove part 37. The left-right motion detection part 56 is a contact-type sensor that performs detection when the side surface of the finger is in contact therewith, or a non-contact-type sensor that performs detection even if the side surface of the finger is not in contact therewith (for example, a range sensor). It should be noted that the motion of the finger in the left-right direction may be detected by the touch sensor if the touch sensor is provided on the surfaces of the rotating members 45*a* to 45*e*.

Figure 8:
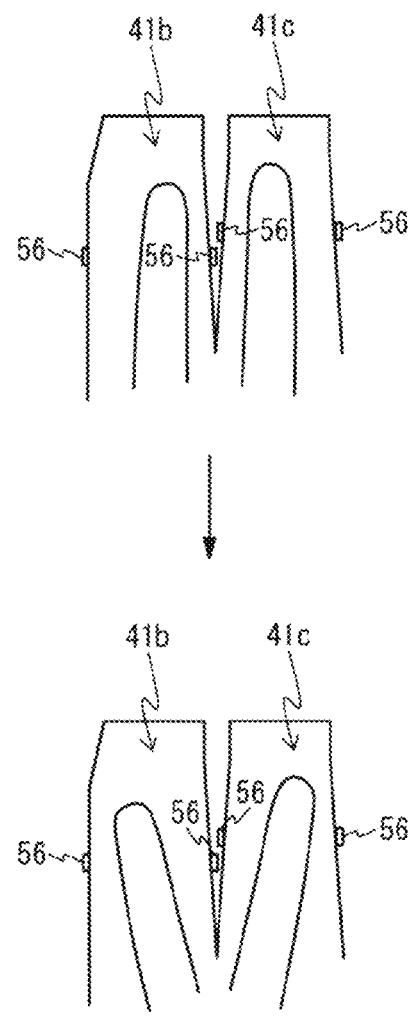
FIG. 8 is a schematic diagram illustrating a motion of the fingers in a left-right direction.

FIG. 8 is a schematic diagram illustrating the motion of the fingers in a left-right direction. FIG. 8 shows the index finger and middle finger spreading apart from each other.

When the index finger and the middle finger are moving in the left-right direction as shown in FIG. 8, the left-right motion detection part 56 arranged in the finger contact part 41*b* detects the position of the index finger in the left-right direction, and the left-right motion detection part 56 arranged in the finger contact part 41*c* detects the position of the middle finger in the left-right direction. Thus, the motion of the index finger and the middle finger in the left-right direction can be appropriately detected.

In the above description, the phalange detection part 52 is arranged at a position corresponding to the proximal phalange of the finger of the operator, but the present invention is not limited thereto. For example, the phalange detection part 52 may be arranged as shown in FIG. 9.

Figure 9:
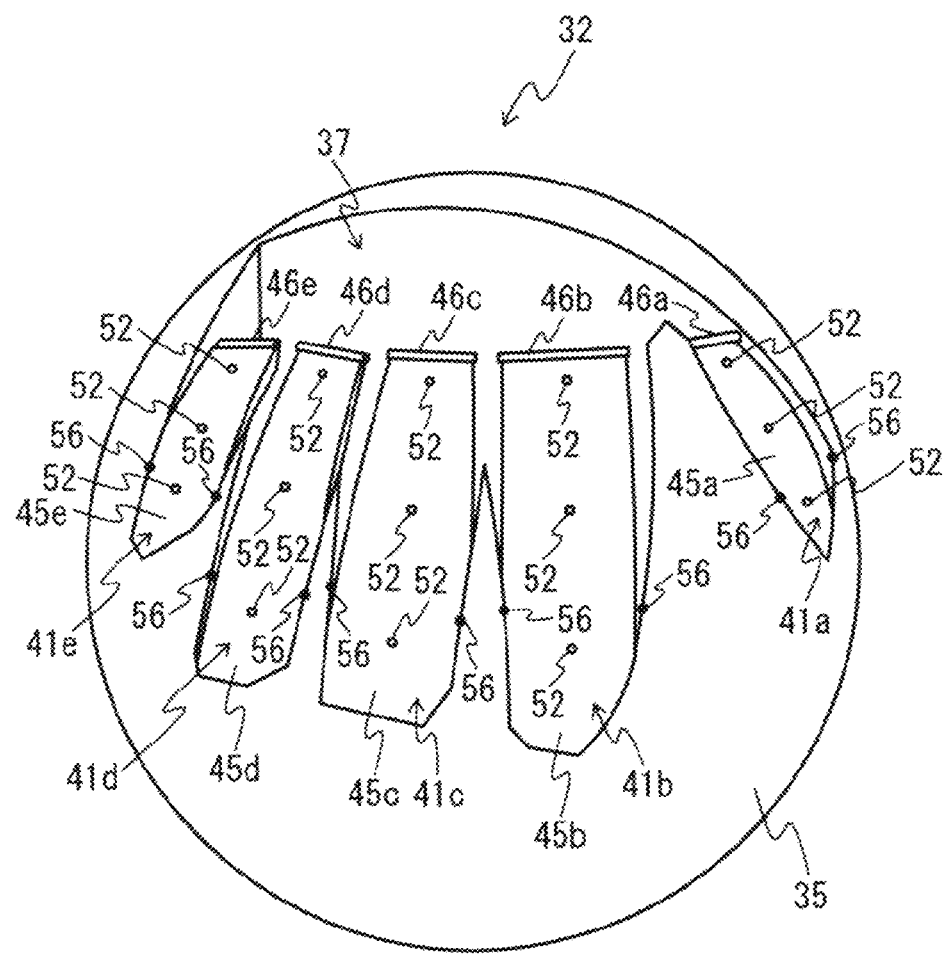
FIG. 9 is a schematic diagram illustrating an example of arrangements of phalange detection parts 52.

FIG. 9 is a schematic diagram illustrating an example of arrangements of the phalange detection parts 52. The phalange detection part 52 may be arranged at a position corresponding to the proximal, middle, and distal phalanges of the finger, respectively. Using three phalange detection parts 52 allows detection of the state of each phalange of the finger, thereby detecting the motion of the finger with higher accuracy. Providing the three phalange detection parts 52 eliminates the necessity of providing the above-described position detection part 54.

Further, the phalange detection parts 52 may be arranged at positions corresponding to two of the proximal, middle, and distal phalanges of the finger. For example, the phalange detection parts 52 may be arranged at the positions corresponding to the proximal phalange and the distal phalange of the finger.

The finger contact parts 41*a* to 41*e* are provided with the driving part 62 (FIG. 1) to generate the force sense to be transmitted to the finger as described above. The driving part 62 rotates the rotating members 45*a* to 45*e* to transmit the force sense to the finger when the multi-fingered robot 10 touches the object.

Figure 10:
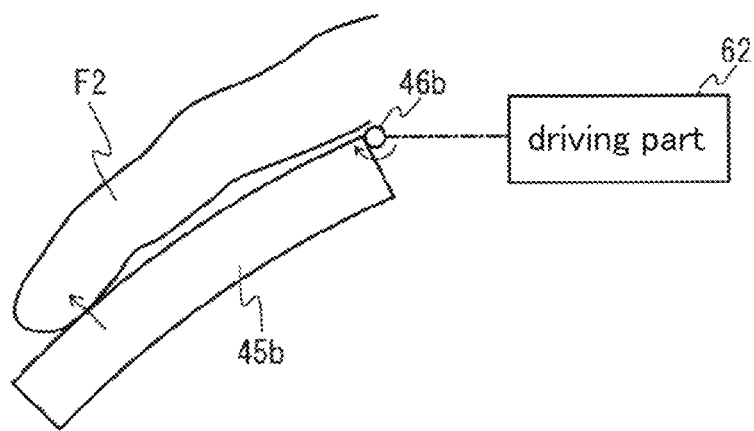
FIG. 10 is a schematic diagram illustrating a configuration example of a driving part 62.

FIG. 10 is a schematic diagram illustrating a configuration example of the driving part 62. FIG. 10 shows the driving part 62 for rotating the rotating member 45*a*, but the driving part 62 for rotating the rotating members 45*b* to 45*e* have the same configuration. The driving part 62 here is a motor which is connected to a shaft part 46*b* of the rotating member 45*b*. The driving part 62 rotates the rotating member 45*b* in a direction (second direction) opposite to the pressing direction (first direction) in which the index finger F2 presses the rotating member 45*b*. Specifically, as shown in FIG. 10, the driving part 62 causes the rotating member 45*b* to rotate clockwise about the shaft part 46*b*, thereby transmitting the force sense to the index finger F2 from the rotating member 45*b*.

It should be noted that the driving part 62 rotates the rotating member 45*b* in the direction opposite to the pressing direction in the above description, but the present invention is not limited thereto. For example, the driving part 62 may rotate the rotating member 45*b* in the direction opposite to the pressing direction, stop the rotating member 45*b* temporarily, and then further rotate the rotating member 45*b* in the same direction as the pressing direction. As an illustration, when the multi-fingered robot 10 bends the finger mechanism 12 to grab an egg, the driving part 62 generates the force sense at the time when the finger mechanism 12 touches the egg, and so the operator stops the finger. If the operator further presses the finger in the pressing direction thereafter, the multi-fingered robot 10 drives the finger mechanism 12 and breaks the egg. Then, the finger mechanism 12 further moves in the bending direction due to the breaking of the egg.

In order to feedback the position to the operator after this motion, the driving part 62 rotates the rotating member 45*b* in the pressing direction.

Figure 11:
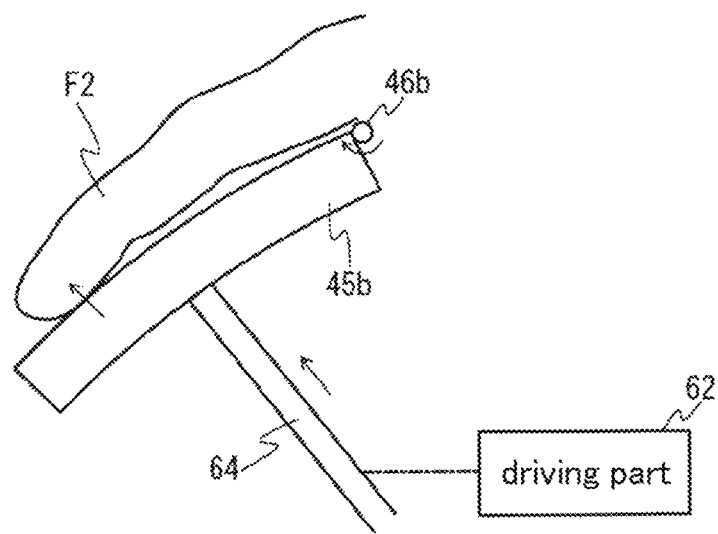
FIG. 11 is a schematic diagram illustrating a variation of the configuration of the driving part 62.

FIG. 11 is a schematic diagram illustrating a variation of the configuration of the driving part 62. In the variation shown in FIG. 11, the driving part 62 is not connected to the shaft part 46*b* of the rotating member 45*b*, and moves a rod 64 arranged below the rotating member 45*b*. The rod 64 moves in the direction (upward direction) indicated by the arrow in FIG. 11, for example, such that the rotating member 45*b* rotates clockwise about the shaft part 46*b*. Thus, the driving part 62 moves the rod 64 upward to rotate the rotating member 45*b*, thereby transmitting the force sense from the rotating member 45*b* to the index finger F2.

In the above description, the force sense is transmitted to the finger contact parts 41*a* to 41*e* of the contact part 40 as the sensory feedback to the operator's finger, but the invention is not limited thereto. For example, the contact part 40 may give vibration or electrical stimulation to the fingertip to give the finger a rough or slimy feel. In addition, the contact part 40 may include a device that transmits a sensation to the finger in accordance with temperature.

It should be noted that, in the above description, the rotating members 45*a* to 45*e* are arranged on the outer peripheral surface of the device main body 32 such that the operator moves the finger with the palm side of his/her hand placed on the device main body 32 as shown in FIG. 3, but the present invention is not limited thereto. For example, as shown in FIG. 12, the rotating members 45*a* to 45*e* may be arranged inside of the device main body 32.

Figure 12:
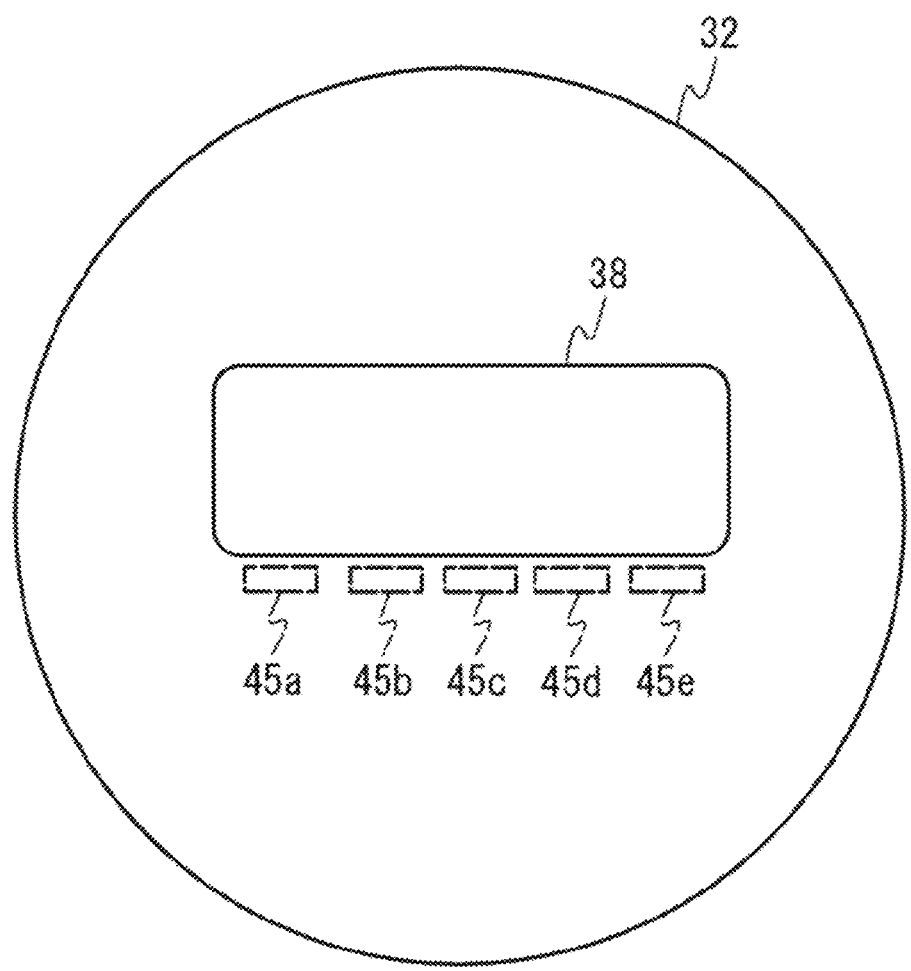
FIG. 12 is a schematic diagram illustrating a configuration of the device main body 32 according to the variation.

FIG. 12 is a schematic diagram illustrating a configuration of the device main body 32 according to the variation. The device main body 32 according to the variation has an insertion hole 38 into which the operator can insert his/her finger. The insertion hole 38 here may have a shape that allows a hand to be inserted easily and has, for example, a rectangular shape. Then, the rotating members 45*a* to 45*e* are each rotatably arranged in the insertion hole 38. Therefore, in this variation, the operator moves his/her fingers relative to the rotating members 45*a* to 45*e* inside of the device main body 32 by inserting his/her hand from the insertion hole 38.

Even in the variation shown in FIG. 12, the detection part 50 (FIG. 1) detects the motion of the finger in the device main body 32 (the motion in which the fingers press the rotating members 45*a* to 45*e*). The detection part 50 includes the phalange detection part 52, the position detection part 54, and the left-right motion detection part 56 as described above. As a result, the motion of the finger inside of the device main body 32 can be detected with higher accuracy.

In the above description, the rotating members 45*a* to 45*e* pressed by the fingers are used, but the present invention is not limited thereto. For example, a pointing stick that can be operated by a finger may be used. In this case, the pressing force of the finger on the pointing stick is assigned to the acceleration, velocity, and displacement of the phalange of the corresponding multi-finger robot 10 (multi-articulated robot).

In the above description, the multi-fingered robot 10 is a robot hand which has a shape following a shape of a human hand, but the present invention is not limited thereto.

For example, the multi-fingered robot 10 may be a robot which has a shape following a shape of a human leg. In this case, the control device 70 may operate one leg (here, the left leg) of the multi-fingered robot 10 when the detection part 50 detects the motion of the index finger of the hand, and may operate the other leg (the right leg) of the multi-fingered robot 10 when the detection part 50 detects the motion of the middle finger.

Effects in the Present Embodiment

The motion detecting device 30 of the present embodiment described above includes the device main body 32 on which the finger of the operator is placed, the contact part 40 formed in the device main body 32 following the shape of the finger and which the finger contacts, and the detection part 50 that detects the motion of the finger on the basis of the pressing state of the finger against the contact part 40.

With the above configuration, the operator can remotely control the multi-fingered robot 10 by moving the finger placed on the device main body 32. Therefore, compared to the conventional method of putting the glove on the hand, placing the hand is easier and the durability of the device main body 32 is also excellent. Further, the detection part 50 detects the motion of the finger on the basis of the pressing state of the finger against the contact part 40 following the shape of the finger, thereby detecting the fine motion or the like of the finger with higher accuracy. This enables a fine operation of the multi-fingered robot 10.

The present invention is explained on the basis of the exemplary embodiments. The technical scope of the present invention is not limited to the scope explained in the above embodiments and it is possible to make various changes and modifications within the scope of the invention. For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments of the present invention. Further, effects of the new exemplary embodiments brought by the combinations also have the effects of the original exemplary embodiments.

What is claimed is:

1. A motion detecting device for detecting a motion of an operator's finger for remotely operating a multi-articulated robot, the motion detecting device comprising:
    a device main body that is installed such that the finger is placed thereon;
    a contact part that is where the finger contacts the device main body and has a shape following a shape of the finger; and
    a detection part that detects the motion of the finger on the basis of a pressing state of the finger against the contact part,
    wherein the contact part includes a rotating part that rotates around an axis perpendicular to a longitudinal direction of the finger in accordance with a pressing of the finger,
    wherein the detection part includes a position detection part that detects a position of a fingertip of the finger on the rotating part,
    wherein the detection part detects the motion of the finger to estimate a posture of the finger, on the basis of the rotation amount of the rotating part and the position of the fingertip detected by the position detection part.

2. The motion detecting device according to claim 1, wherein
    a region of the contact part that is contacted by a pad of the finger is curved at a predetermined curvature.

3. The motion detecting device according to claim 1, wherein
    a surface of the rotating part pressed by the finger is a curved surface having a predetermined curvature along an outer peripheral surface of the device main body.

4. The motion detecting device according to claim 1, wherein
    the detection part further detects the posture of the finger on the basis of the pressing state of the finger against the contact part.

5. The motion detecting device according to claim 1, wherein
    the contact part is a groove part that follows the shape of the finger.

6. The motion detecting device according to claim 5, wherein
    the groove part is formed on the outer peripheral surface of the device main body.

7. The motion detecting device according to claim 1, wherein
    the device main body has an insertion hole in which the finger can be inserted, and the contact part is provided in the insertion hole.

8. The motion detecting device according to claim 1, wherein
    the device main body has a spherical part having a spherical shape or a shape which is partially ellipsoid or entirely ellipsoid, and
    the contact part is provided on the outer peripheral surface of the spherical part.

9. The motion detecting device according to claim 1, wherein
    the detection part is arranged at a position corresponding to at least one of a proximal phalange, middle phalange, and distal phalange of the finger contacting the contact part, and has a phalange detection part for detecting a pressing state of the finger.

10. The motion detecting device according to claim 9, wherein
    a plurality of the phalange detection parts are arranged at positions corresponding to the proximal phalange, the middle phalange, and the distal phalange of the finger.

11. The motion detecting device according to claim 1, wherein
    the detection part is arranged at a position corresponding to at least one of the proximal phalange, the middle phalange, and the distal phalange of the finger contacting the contact part, and has a phalange detection part for detecting a pressing state of the finger, and
    the phalange detection part and the position detection part are provided on the rotating part.

12. The motion detecting device according to claim 6, wherein
    the detection part is arranged in a region of the groove part where a side surface of the finger contacts and detects the motion of the finger at least in one of the right and left directions.

13. The motion detecting device according to claim 7, wherein
    the detection part is arranged in a region of the insertion hole where the side surface of the finger contacts and detects the motion of the finger at least in one of the right and left directions.

14. The motion detecting device according to claim 1, further comprising:

a force sense generating part that generates a force sense corresponding to a reaction force from an object when the multi-articulated robot touches the object.

15. The motion detecting device according to claim 14, wherein the force sense generating part includes a driving part that rotates the rotating part in a second direction that is a direction opposite of the first direction, wherein the driving part causes the rotating part to rotate in the second direction to generate the force sense.

16. The motion detecting device according to claim 1, wherein the motion detecting device is configured to communicate with a control device to operate the multi-articulated robot and the estimated posture is provided to the control device so that the control device operates the multi-articulated robot to correspond with the estimated posture.

* * * * *